United States Patent [19]

Neeff et al.

[11] 4,290,768
[45] Sep. 22, 1981

[54] PROCESS FOR DYEING AND PRINTING CELLULOSE FIBRES

[75] Inventors: Rütger Neeff, Leverkusen; Robert Kuth, Cologne; Werner Kühnel; Wilhelm Gohrbandt, both of Leverkusen, all of Fed. Rep. of Germany

[73] Assignee: Bayer Aktiengesellschaft, Leverkusen, Fed. Rep. of Germany

[21] Appl. No.: 110,033

[22] Filed: Jan. 7, 1980

[30] Foreign Application Priority Data

Jan. 27, 1979 [DE] Fed. Rep. of Germany ....... 2903132

[51] Int. Cl.³ .................. D06P 3/852; D06P 1/24; C09B 1/26
[52] U.S. Cl. .......................... 8/532; 8/611; 8/677; 8/678; 8/688; 8/918
[58] Field of Search .................. 8/21 C, 54.2, 39 R, 8/93, 532, 677, 688, 678, 918, 611

[56] References Cited

U.S. PATENT DOCUMENTS

| | | | |
|---|---|---|---|
| 3,706,525 | 12/1972 | Blackwell et al. | 8/21 C |
| 3,711,245 | 1/1973 | Neumer | 8/21 C |
| 3,744,967 | 7/1973 | Thakrah | 8/54.2 |
| 3,752,645 | 8/1973 | McGuire | 8/21 C |
| 3,752,646 | 8/1973 | Blackwell | 8/21 C |
| 3,752,647 | 8/1973 | Mentzer | 8/21 C |
| 3,888,624 | 6/1975 | Blackwell et al. | 8/21 C |
| 4,049,377 | 9/1977 | Schwab et al. | 8/169 |
| 4,146,535 | 3/1979 | Dehnert et al. | 8/532 |
| 4,157,893 | 6/1979 | Dehnert et al. | 8/611 |
| 4,198,205 | 4/1980 | Elser et al. | 8/552 |

FOREIGN PATENT DOCUMENTS 1191060 4/1965 Fed. Rep. of Germany.
2528743 1/1977 Fed. Rep. of Germany.
2739176 5/1978 Fed. Rep. of Germany.

Primary Examiner—A. Lionel Clingman
Attorney, Agent, or Firm—Sprung, Felfe, Horn, Lynch & Kramer

[57] ABSTRACT

In order to dye and print cellulose fibres, which have been swollen with water-miscible swelling agents, or fibre mixtures containing such cellulose fibres, the fibres are treated with a dyestuff of the general formula

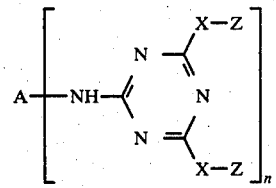

wherein
  A denotes an optionally substituted anthraquinone radical, which can contain a further fused ring,
  X denotes oxygen or sulphur,
  Z denotes a mononuclear or binuclear aryl radical and
  n denotes 1 or 2,
and the dyestuff is fixed by means of a heat treatment.

1 Claim, No Drawings

PROCESS FOR DYEING AND PRINTING CELLULOSE FIBRES

The invention relates to a process for dyeing and printing cellulose fibres, or fibre mixtures containing cellulose fibres, which have been swollen with water-miscible swelling agents.

The process is characterised in that the fibres are treated with a dyestuff of the general formula

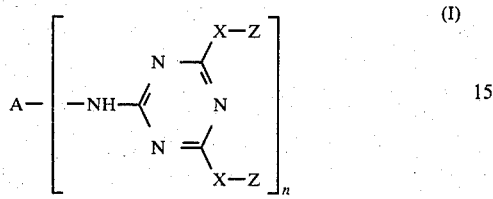

wherein
A denotes an optionally substituted anthraquinone radical, which can contain a further fused ring,
X denotes oxygen or sulphur,
Z denotes a mononuclear or binuclear aryl radical and
n denotes 1 or 2,
and the dyestuff is fixed by means of a heat treatment.

The invention further relates to dyestuff formulations for dyeing and printing of cellulose and cellulose-containing fibre material, which contain a dyestuff of the formula (I).

The dyestuffs of the formula (I) are free from substituents which confer solubility in water.

The anthraquinone dyestuffs of the formula (I), used according to the invention, may contain one or more, especially one or two, substituents in the anthraquinone radical in addition to the grouping

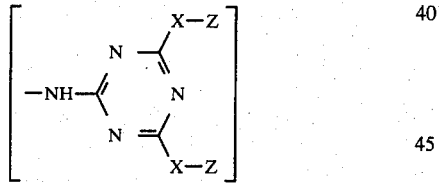

examples of such substituents being halogen atoms, such as fluorine, chlorine or bromine, alkyl groups with 1-6 C atoms, hydroxyl groups, alkoxy groups, aryloxy groups, amino groups, alkanoylamino or aroylamino groups, alkylamino, cycloalkylamino or arylamino groups, alkylthioether or arylthioether radicals, alkylsulphonylamino or arylsulphonylamino groups, optionally substituted sulphonamide groups, and cyano, carboxyl, carboxylic acid ester and sulphonic acid ester groups, especially $C_1$-$C_4$-alkyl ester groups, aroyl groups or acetyl groups. The abovementioned aryl radicals are preferably phenyl groups which can be substituted by one or more halogen atoms, $C_1$-$C_6$-alkoxy or $C_1$-$C_6$-alkyl groups. The alkyl groups mentioned are in particular lower alkyl radicals with 1-4 C atoms. Cycloalkyl preferably represents cyclohexyl. Examples of tetracyclic anthraquinone radicals are 1,9-isothiazolanthrone, 1,9-anthrapyrimidine, 1,9-pyrazolanthrone or N-methyl-anthrapyridone.

The aryl radicals defined by Z are preferably phenyl or naphthyl groups, which can be substituted by one or more halogen atoms or $C_1$-$C_6$-alkyl or $C_1$-$C_6$-alkoxy groups.

Preferred dyestuffs correspond to the formula

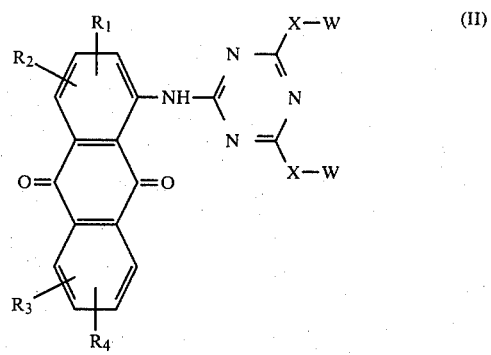

wherein
X denotes oxygen or sulphur,
W denotes a phenyl group which is substituted by one or more halogen atoms, or $C_1$-$C_6$-alkyl or alkoxy radicals and
$R_1$, $R_2$, $R_3$ and $R_4$ denote hydrogen, fluorine, chlorine or bromine, hydroxyl, amino, cyano, nitro, $C_1$-$C_4$-alkylamino, $C_1$-$C_6$-alkanoylamino, $C_1$-$C_6$-alkylsulphonylamino, acetyl, $C_1$-$C_6$-alkylsulphonyl, optionally $C_1$-$C_4$-alkoxy-substituted $C_1$-$C_4$-alkoxy or $C_1$-$C_4$-alkoxycarbonyl groups, optionally halogen-, $C_1$-$C_6$-alkyl- or $C_1$-$C_6$-alkoxy-substituted phenylamino, phenoxy, phenylthio, benzoyl, phenylsulphonyl, phenoxysulphonyl, phenylsulphonylamino, phenoxycarbonyl, benzoylamino or cyclohexyl groups, or a radical of the formula

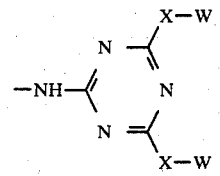

The preparation of the dyestuffs of the formula (I), which are described, for example, in DE-AS (German Published Specification) No. 1,191,060, is carried out in accordance with processes which are in themselves known, for example by reacting 2-(anthraquinonylamino)-4,6-dichloro-1,3,5-triazines of the formula

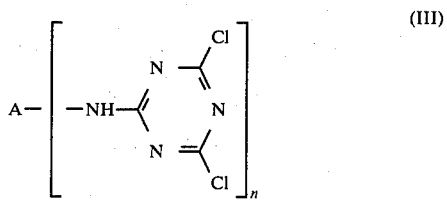

in which A and n have the abovementioned meaning, with optionally substituted phenols, thiophenols, naphthols or thionaphthols.

It has new been found that the dyestuffs of the formula (I) which are free from fibre-reactive groups are outstandingly suitable for dyeing and printing waterswellable cellulose fibres and fibre mixtures containing such cellulose fibres, if the dyestuffs are applied in accordance with the process known from DE-AS (German Published Specification) No. 1,811,796. In this process the fibres are brought into contact, before or simultaneously with the dyestuff treatment, with an amount of water which suffices for swelling the cellulose, and with a water-miscible swelling agent. The swelling agent must be capable of maintaining the swelling of the cellulose when the water is removed, and of dissolving the dyestuff, if necessary with the aid of an additional solubilising agent, at the dyeing temperature.

The swelling agent is in general added in an amount of 10 to 30% by weight, relative to the cellulose fibres. Suitable swelling agents have a boiling point of above 150° C.

The dyestuff and the swelling agent can be applied to the fibre simultaneously, or the fibre can first be treated with the swelling agent and subsequently with the aqueous dyestuff dispersion.

Finally, the dyestuff is fixed by a heat treatment, especially at 150°-230° C.

The process is suitable for dyeing and printing both natural cellulose and regenerated cellulose.

The process is of particular interest for dyeing and printing fibre mixtures of cellulose and synthetic fibres, such as polyamide and polyester fibres, especially cotton-polyester fibre mixtures, since it permits dyeing or printing in matching shades by a one-step method.

Processes of this type, and further auxiliaries which can be used instead of the products known from DE-AS (German Published Specification) No. 1,811,796 are known, for example, from German Offenlegungsschriften (German Published Specifications) Nos. 2,524,243, 2,528,743 and 2,751,830.

The dyestuffs (I) give dyeings and prints whose colour shades lie between yellow, red and blue and match well on the fibre mixtures. The dyeings and prints are distinguished by very good fastness properties, amongst which, in addition to the wash-fastness, it is above all the sublimation-fastness, light-fastness and fastness to drycleaning which should be singled out.

The dyestuff formulations according to the invention can, in addition to water, contain customary constituents such as dispersing agents, for example nonionic and/or anionic and/or cationic dispersing agents, thickeners and/or swelling agents and/or dyestuff solubilising agents.

The parts mentioned in the examples which follow are parts by weight, and the degrees are degrees Centigrade.

EXAMPLE 1

(a) 200-300 parts of the dyestuff of the formula

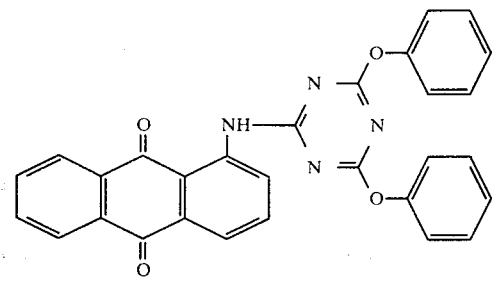

are mixed with 60 to 90 parts of a nonionic dispersing agent, and the mixture is made up to 1,000 parts with water and dispersed in a ball mill or other suitable apparatus. To prevent rapid drying-up of the dyestuff paste, a small amount of preservative and of glycols or glycerol can also be added to the paste.

(b) A 50:50 polyester/cotton fabric is printed with a print paste consisting of

| | |
|---|---|
| 1-50 parts | of the dyestuff paste from paragraph (a) |
| 100 parts | of polyethylene glycol (molecular weight about 400) |
| 399-350 parts | of water and |
| 500 parts | of a 10% strength guar flour thickener |
| 1,000 parts | | a rotary screen printing machine or a screen printing table being used. (When using a roller printing machine, the amount of the polyethylene glycol must be increased to 150-200 parts, depending on the depth of the gravure).

The fabric is then dried, fixed for 1 minute at 210° by dry heat, rinsed, soaped, again rinsed and dried.

A wash-fast and light-fast yellow print is obtained.

EXAMPLE 2-15

The procedure described in Example 1 is followed, but the dyestuffs described in the table below, of the formula

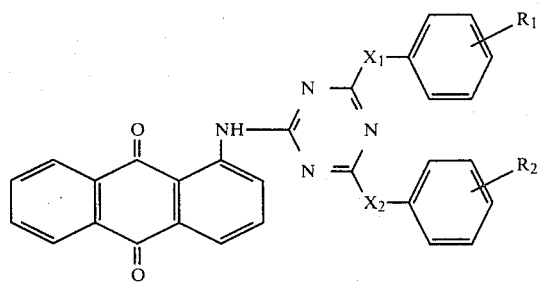

are used.

| Ex. | $X_1$ | $X_2$ | $R_1$ | $R_2$ | Shade |
|---|---|---|---|---|---|
| 2 | O | O | 4-CH$_3$ | 4-CH$_3$ | yellow |
| 3 | O | O | 4-C(CH$_3$)$_3$ | 4-C(CH$_3$)$_3$ | yellow |
| 4 | O | O | 2(3)(4)-CH$_3$ | 2(3)(4)-CH$_3$ | yellow |
| 5 | O | O | 4-Cl | 4-Cl | yellow |
| 6 | O | O | 3-Br | 3-Br | yellow |
| 7 | O | O | 2-OCH$_3$ | 2-OCH$_3$ | yellow |
| 8 | O | O | H | 4-OC$_2$H$_5$ | yellow |
| 9 | O | O | H | 4-Cl | yellow |
| 10 | S | S | H | H | yellow |
| 11 | S | S | 4-Cl | 4-Cl | yellow |
| 12 | S | S | 4-CH$_3$ | 4-CH$_3$ | yellow |
| 13 | S | S | 4-C(CH$_3$)$_3$ | 4-C(CH$_3$)$_3$ | yellow |
| 14 | S | O | H | H | yellow |
| 15 | S | O | H | 4-OCH$_3$ | yellow |

The prints obtained are distinguished by good light-fastness and wash-fastness characteristics.

EXAMPLE 16-30

The procedure described in Example 1 is followed, but the dyestuffs described in the table below, of the formula

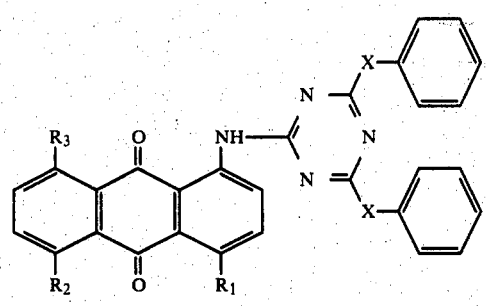

are used.

| Ex. | X | $R_1$ | $R_2$ | $R_3$ | Shade |
|---|---|---|---|---|---|
| 16 | O | OH | H | H | scarlet |
| 17 | S | OH | H | H | scarlet |
| 18 | O | NH—CO—$C_6H_5$ | H | H | red |
| 19 | O | NH—⟨phenyl⟩—$CH_3$ | H | H | blue |
| 20 | S | NH—⟨phenyl⟩—Cl | H | H | blue |
| 21 | S | NH—⟨cyclohexyl⟩ | H | H | blue |
| 22 | O | NH—CH($CH_3$)$_2$ | H | H | blue |
| 23 | O | S—⟨phenyl⟩ | H | H | red |
| 24 | S | S—⟨phenyl⟩—Cl | H | H | red |
| 25 | O | OH | $NH_2$ | OH | blue |
| 26 | S | OH | $NH_2$ | OH | blue |
| 27 | O | OH | OH | $NH_2$ | blue |
| 28 | S | OH | OH | $NH_2$ | blue |
| 29 | O | NH—$SO_2$—⟨phenyl⟩—$CH_3$ | H | H | bluish-red |
| 30 | O | OH | $NO_2$ | OH | blue |

Wash-fast and light-fast prints having the colour shades indicated in the table are obtained.

EXAMPLE 31–46

The procedure described in Example 1 is followed, but the dyestuffs described in the table below, of the formula

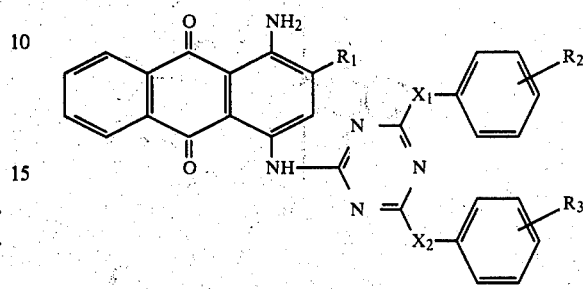

are used.

| Ex. | $X_1$ | $X_2$ | $R_1$ | $R_2$ | $R_3$ | Shade |
|---|---|---|---|---|---|---|
| 31 | O | O | Br | H | H | blue |
| 32 | S | S | Br | H | H | blue |
| 33 | S | O | Br | 4-$CH_3$ | 4-$CH_3$ | blue |
| 34 | O | O | O—$CH_3$ | H | H | blue |
| 35 | O | O | O—$CH_2$—$CH_2$—$OCH_3$ | H | H | blue |
| 36 | O | O | O—$C_6H_5$ | H | H | blue |
| 37 | O | O | S—$C_6H_5$ | H | H | blue |
| 38 | O | O | CN | H | H | blue |
| 39 | O | O | O—$C_6H_5$ | H | H | blue |
| 40 | O | O | $SO_2$—$CH_3$ | H | H | blue |
| 41 | O | O | $SO_2$—$C_6H_5$ | H | H | blue |
| 42 | O | O | $SO_2$—$OC_6H_5$ | H | H | blue |
| 43 | O | O | CO—$CH_3$ | H | H | blue |
| 44 | O | O | CO—$C_6H_5$ | H | H | blue |
| 45 | O | O | COO—$C_2H_5$ | H | H | blue |
| 46 | O | O | $COOC_6H_5$ | $C(CH_3)_3$ | H | blue |

Wash-fast and light-fast prints having the colour shades indicated in the table are obtained.

EXAMPLE 47–52

The procedure described in Example 1 is followed, but the dyestuffs mentioned in the table below are used:

| Ex. | Dyestuff | Shade |
|---|---|---|
| 47 | 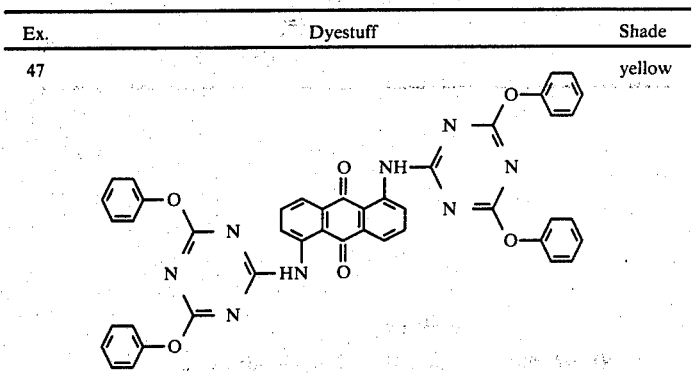 | yellow |

-continued

| Ex. | Dyestuff | Shade |
|---|---|---|
| 48 | | bluish-red |
| 49 | | yellow |
| 50 | | yellow |
| 51 | | orange |
| 52 | | yellow |

EXAMPLE 53

(a) 200–300 parts of the dyestuff of the formula

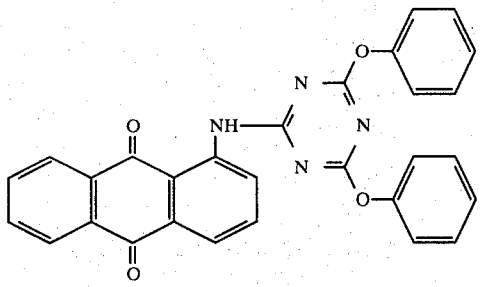

are mixed with 60 to 90 parts of a nonionic dispersing agent, and the mixture is made up to 1,000 parts with water and is dispersed in a ball mill or other apparatus. To prevent excessively rapid drying-up of the dyestuff paste, a small amount of preservative and of glycols or glycerol can also be added to the paste.

(b) A 65:35 polyester/cotton fabric is printed with a print paste consisting of

| | |
|---|---|
| 1–50 parts | of the dyestuff paste from paragraph (a) |
| 100 parts | of the boric acid ester of a polyethylene glycol (molecular weight 300) |
| 399–350 parts | of water and |
| 500 parts | of a 4% strength alginate thickener |
| 1,000 parts | | using a rotary screen printing machine or a screen printing table.

A wash-fast and light-fast yellow print is obtained.

EXAMPLE 54

30 parts by weight of the dyestuff of Example 1, together with 15 parts by weight of a reaction product of abietic acid with about 50 mols of ethylene oxide, and 55 parts of water, are finely dispersed by means of a bead mill. The following dyeing liquor is prepared from this finished dyestuff:

| | |
|---|---|
| 70 parts | of dyestuff formulation |
| 100 parts | of a polyethylene glycol of molecular weight 500, and |
| 10 parts | of a 10% strength aqueous solution of a polyacrylate in |
| 820 parts | of water |
| 1,000 parts | |

A polyester/cotton fibre mixture, having a ratio of polyester to cotton of 65:35 to 50:50, is impregnated by means of a padder, the liquor pick-up of the fabric being 35–50%. The fabric thus treated is dried and the dyestuff is fixed onto both fibres by a hot air treatment in a thermosol unit at 215° C. for 60 seconds onto both fibre constituents.

After the customary soaping after-treatment at 60° C., and drying, a yellow shade is obtained, which matches very well on the two materials. The dyeing produced exhibits good fastness to daylight, dry rub fastness and wet rub fastness, and very good wash-fastness.

Good results are also achieved if instead of the dyestuff of Example 1 the dyestuff of Example 10 is used.

We claim:

1. Process for dyeing and printing cellulose fibres, or fibre mixtures containing cellulose fibres, which have been swollen with water-miscible swelling agents capable of maintaining the fibres in swollen condition after removal of water and boiling above 150° C., characterized in that the fibres are treated with a dyestuff of the general formula

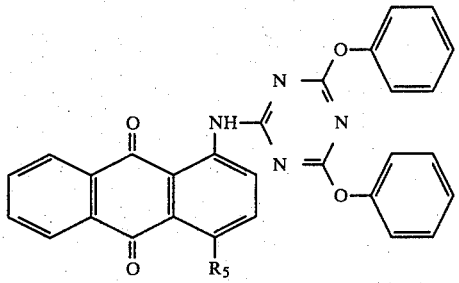

wherein
$R_5$ is hydrogen, a hydroxyl or cyclohexyl group or a phenylamino or benzoylamino group, which can be substituted in the phenyl ring by halogen, $C_1$–$C_4$-alkyl or $C_1$–$C_4$-alkoxy,
and the dyestuff is fixed by means of a heat treatment.

* * * * *